(12) United States Patent
Geiselhart et al.

(10) Patent No.: US 12,198,076 B2
(45) Date of Patent: Jan. 14, 2025

(54) SERVICE MANAGEMENT IN A DBMS (71) Applicant: INTERNATIONAL BUSINESS MACHINES CORPORATION, Armonk, NY (US)

(72) Inventors: Reinhold Geiselhart, Rottenburg-Ergenzingen (DE); Knut Stolze, Hummelshain (DE); Felix Beier, Haigerloch (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/797,562

(22) Filed: Feb. 21, 2020

(65) Prior Publication Data

US 2020/0356885 A1 Nov. 12, 2020

(30) Foreign Application Priority Data

May 10, 2019 (EP) ..................................... 19173726

(51) Int. Cl.
*G06F 16/21* (2019.01)
*G06F 9/445* (2018.01)
(Continued)

(52) U.S. Cl.
CPC ........... *G06N 7/01* (2023.01); *G06F 9/44526* (2013.01); *G06F 16/168* (2019.01); *G06F 16/21* (2019.01);
(Continued)

(58) Field of Classification Search
None
See application file for complete search history.

(56) References Cited

U.S. PATENT DOCUMENTS 7,444,621 B2  10/2008  Pletcher
8,020,034 B1 *  9/2011  Shrivastava ........ G06F 11/1482
                                              714/4.11
(Continued)

FOREIGN PATENT DOCUMENTS

CN  101763428 A  6/2010
CN  102455937 A  5/2012
(Continued)

OTHER PUBLICATIONS

Automatic management of cyclic dependency among web services, Omer et al, IEEE International Conference on Computational Science and Engineering. (Year: 2011).*

(Continued)

*Primary Examiner* — Augustine K. Obisesan
(74) *Attorney, Agent, or Firm* — Edward J. Wixted, III (57) ABSTRACT

The invention relates to a computer-implemented method for managing multiple services in a DBMS. The services respectively are configured to process data that is stored in or is received for being stored in a database managed by the DBMS. The method comprises providing a service manager operatively coupled to the DBMS; registering the multiple services automatically and dynamically at runtime of the DBMS at the service manager; and automatically managing, by the service manager, dependencies between different ones of the multiple registered services.

18 Claims, 4 Drawing Sheets

(51) Int. Cl.
  *G06F 16/16*  (2019.01)
  *G06F 16/25*  (2019.01)
  *G06F 16/901*  (2019.01)
  *G06N 7/01*  (2023.01)

(52) U.S. Cl.
  CPC ........ *G06F 16/252* (2019.01); *G06F 16/9024* (2019.01)

(56) References Cited

U.S. PATENT DOCUMENTS

| | | | |
|---|---|---|---|
| 8,024,740 B2 | 9/2011 | Kawato | |
| 8,434,087 B2 | 4/2013 | Degenaro | |
| 8,527,458 B2 | 9/2013 | Park | |
| 9,009,101 B2 | 4/2015 | Bhatt | |
| 9,348,630 B2 | 5/2016 | Shimogawa | |
| 9,921,878 B1 | 3/2018 | Schuster | |
| 2003/0018825 A1* | 1/2003 | Johnson, Jr. | G06F 9/465 719/310 |
| 2006/0036773 A1* | 2/2006 | Syrtsov | H04W 4/00 709/250 |
| 2008/0276231 A1* | 11/2008 | Huang | G06F 8/71 717/145 |
| 2009/0299979 A1* | 12/2009 | Suh | G06Q 10/30 705/308 |
| 2010/0149583 A1* | 6/2010 | Tian | H04L 67/02 358/1.15 |
| 2011/0167142 A1* | 7/2011 | Patel | H04L 41/5045 718/1 |
| 2012/0030680 A1* | 2/2012 | Chang | H04L 41/5051 718/102 |
| 2012/0200412 A1* | 8/2012 | Boettner | G01D 4/002 340/540 |
| 2014/0289638 A1 | 9/2014 | Becker | |
| 2014/0320917 A1* | 10/2014 | Changsong | H04N 1/00 358/1.15 |
| 2015/0154233 A1 | 6/2015 | Lightner | |
| 2017/0003675 A1 | 1/2017 | Reichle | |
| 2018/0052718 A1* | 2/2018 | Demulder | G06F 9/52 |

FOREIGN PATENT DOCUMENTS

| | | | | |
|---|---|---|---|---|
| CN | 102844754 A | 12/2012 | | |
| CN | 104657447 A | 5/2015 | | |
| CN | 108123996 A | 6/2018 | | |
| CN | 108153547 A | 6/2018 | | |
| CN | 108475360 A | 8/2018 | | |
| CN | 109710220 A | 5/2019 | | |
| IN | 201817023784 A | * | 11/2018 | G06Q 10/06 |
| JP | 2001034493 A | 2/2001 | | |
| JP | 2005025383 A | 1/2005 | | |
| JP | 2005235221 A | 9/2005 | | |
| JP | 2005266917 A | 9/2005 | | |
| JP | 2007538313 A | 12/2007 | | |
| JP | 2009037271 A | 2/2009 | | |
| JP | 2014191776 A | 10/2014 | | |
| WO | 2005106666 A1 | 11/2005 | | |
| WO | 2011123096 A1 | 10/2011 | | |
| WO | 2020229900 A1 | 11/2020 | | |

OTHER PUBLICATIONS

Response to Official Action of the United Kingdom Intellectual Property Office, Jan. 14, 2022, 1 pg., United Kingdom Application No. GB2116491.8.

Baseke, "Registry of Singletons", Code Project, Jan. 6, 2004 [accessed on Feb. 10, 2020], 5 pages, Retrieved from the Internet: <URL: https://www.codeproject.com/Articles/5794/Registry-of-Singletons>.

CRYPTO++, "Static Initialization Order Fiasco", Crypto++ Wiki, [accessed on Feb. 10, 2020], 7 pages, Retrieved from the Internet: <URL: https://www.cryptopp.com/wiki/Static_Initialization_Order_Fiasco>.

Lenahan, "Turnaround Shutdown and Outage Management", Second Edition, ISBN: 0750667877, Dec. 2005, 270 pages, Elsevier Science & technology Books.

Levitt, "Managing maintenance shutdowns and outages", Abstract, 2004 [accessed on Feb. 20, 2020], 2 pages, ISBN: 083113173X; 9780831131739, New York: Industrial Press, Retrieved from the Internet: <URL: https://www.worldcat.org/title/managing-maintenance-shutdowns-and-outages/oclc/53951765>.

Sahoo, "Process plants: shutdown and turnaround management", CRC Press Taylor & Francis Group, 2014, 398 pages, International Standard Book No. 13: 978-1-4665-1734-9, Boca Raton, FL, USA.

Wikipedia, "Manufacturing resource planning", The Free Encyclopedia, [accessed on Feb. 10, 2020], 5 pages, Retrieved from the Internet: <URL: https://en.wikipedia.org/wiki/Manufacturing_resource_planning>.

Wikipedia, "Material requirements planning", The Free Encyclopedia, [accessed on Feb. 10, 2020], 8 pages, Retrieved from the Internet: <URL: https://en.wikipedia.org/wiki/Material_requirements_planning>.

Wikipedia, "Singleton pattern", The Free Encyclopedia, [accessed on Feb. 10, 2020], 7 pages, Retrieved from the Internet: <URL: https://en.wikipedia.org/wiki/Singleton_pattern>.

United Kingdom Intellectual Property Office, Patents Act 1977: Examination Report Under Section 18(3), Application No. GB2116491.8, Date of Mailing Feb. 2, 2022, 3 pgs.

International Searching Authority, "International Search Report," Patent Cooperation Treaty, Jul. 15, 2020, 7 pages, International Application No. PCT/IB2020/053259.

United Kingdom Intellectual Property Office Examination Report dated Dec. 8, 2021, application No. GB2116491.8, 4 pgs.

"Notice of Reasons for Refusal", International Search Report, Application number: Japanese Patent Application No. 2021-566436, Date of Drafting: Reiwa 5(2023) Jun. 28, Toshio 4178 Five B00, Representative/Applicant: TAISA, Tanekazu, 5 pages.

National Intellectual Property Administration, PRC, "Notification of the First Office Action", Application Number or Patent No. 202080032396.1, Issue No. 2023120701702890, Date of Issue: Dec. 7, 2023, 4 pages.

The State Intellectual Property Office of People's Republic of China, "The Second Office Action", Application No. or Publication No. 202080032396.1, Application or Patentee: International Business Machines Corporation, Title of Invention: Service Management in Dbms, 5 pgs.

The State Intellectual Property Office of People's Republic of China, "The Third Office Action", Jun. 12, 2024, 4 pages, Chinese Application No. 202080032396.1.

* cited by examiner

```
static std::pair< std::string, std::string > getIdentifier();
static std::vector< std::pair< std::string, std::string > > getPrerequisites();
static void initialize();
static bool getIsInitialized();
static void shutdown();
static CatalogManager& getInstance();
```

Fig. 6

```
class MySingletonInterface : private boost::noncopyable {
public:
    virtual auto doSomething() -> void = 0;
};

using MySingleton = aqt_services::singletons::Singleton< MySingletonInterface >;
```

A

```
class MySingletonImplementation : public MySingletonInterface {
public:
    using SingletonPrerequisites =
        aqt_services::singletons::SingletonPrerequisites<
            aqt_services::trace::Tracer, MyOtherSingleton >;

virtual auto doSomething() -> void override { ... }
};
```

B

```
aqt_services::singletons::RegisterSingleton<
    MySingletonInterface, MySingletonImplementation > registerMySingleton{};
```

SERVICE MANAGEMENT IN A DBMS

BACKGROUND

The present invention relates to database management systems (DBMSs), and more specifically to the management of services in the context of a DBMS.

In the context of a DBMS, data often needs to be replicated, analyzed, checked or otherwise processed for many different tasks. Some of these tasks can be implemented in the form of services. Some services may be provided as an integral part of the DBMS while other services may be added later, e.g., upon installing a plug-in or add-on of the DBMS. Some services may be instantiated only in response to an explicit query of a user, other services may be implemented in the form of daemons running in the background. For example, IBM's IBM Db2 Analytics Accelerator (IDAA) comprises infrastructure services like the "Configurator" or "Tracer", comprises services offering access to meta data in the catalog and further comprises background services scheduled, e.g., by the "system maintenance" daemon.

Due to the heterogeneity of the type of services integrated into a DBMS and as some services may be added after the installation of the DBMS in accordance with user-specific needs, the management of all data processing services offered by a DMBS is a complex and error-prone task. The situation is further complicated by the fact that often there exist complex dependencies between the different services, e.g., during instantiation or shutdown of a service. Even worse, some services are implemented based on lazy instantiation. This implies that the time when a particular service is instantiated cannot be foreseen in advance.

Current state of the art DBMSs use a single, central piece of software code that lists all services that are supported by the DBMS. This central list of services comprised in a single source code file is hard to maintain, because the list becomes easily outdated, e.g., when a new program library comprising one or more additional services is loaded into the DBMS at runtime of the DBMS. In case the list is specified in the source code, the respective code has to be recompiled upon each source code modification. Hence, using a central list of services for orchestrating the instantiation and shutdown of the services supported by a DBMS is error-prone, complex and highly time consuming.

A further downside of a central list or file that specifies and orchestrates the instantiation of a plurality of services is that those files tend to become highly complex in case a large number of services, e.g., several hundred or even thousands of services, have to be managed. In this case, it may happen that the source code that centrally specifies the dependencies of the different services comprises cyclic dependencies that are hard to identify by a programmer. Such cyclic dependencies may result in endless loops and program failures.

In addition, the use of a central list for orchestrating service instantiation in combination with lazy service instantiation is associated with the disadvantage of increased resource consumption: in order to avoid service instantiation errors when a service is lazily instantiated at an unforeseeable moment in time, a common strategy is to instantiate all services per default upon starting the DBMS that might be required by a particular service that is lazily instantiated. While this strategy may help avoiding errors associated with lazy instantiation, it increases the consumption of CPU and memory resources because services may be instantiated unnecessarily. For example, if a particular service is instantiated just to ensure correct instantiation of a service that is lazily instantiated in response to a user query, this service may unnecessarily consume resources in a situation when no user query in respect to the lazily instantiated service is ever received.

Hence, service management in current DBMSs is a cumbersome, error-prone task that often results in program failures, high CPU and memory consumption, and an inflexible system that is not able to integrate new services and program libraries without modifying and recompiling source code.

SUMMARY

The invention relates to a computer-implemented method, computer readable storage medium and corresponding computer system for managing multiple services in a DBMS as specified in the independent claims. Embodiments of the invention are given in the dependent claims. Embodiments of the present invention can be combined freely with each other if they are not mutually exclusive.

In one aspect, the invention relates to a computer-implemented method for managing multiple services in a DBMS. The services respectively are configured to process data that is stored in or is received for being stored in a database managed by the DBMS. The method comprises: providing a service manager operatively coupled to the DBMS; registering the multiple services automatically and dynamically at runtime of the DBMS at the service manager; automatically managing, by the service manager, dependencies between different ones of the multiple registered services.

In a further aspect, the invention relates to a computer readable storage medium having program instructions embodied therewith, the program instructions executable by a processor to cause the processor to execute a method for managing multiple services in a DBMS. The services are respectively configured to process data that is stored in or is received for being stored in a database managed by the DBMS. The method comprises managing multiple services in a DBMS. The services respectively are configured to process data that is stored in or is received for being stored in a database managed by the DBMS. The method comprises: providing a service manager operatively coupled to the DBMS; registering the multiple services automatically and dynamically at runtime of the DBMS at the service manager; automatically managing, by the service manager, dependencies between different ones of the multiple registered services.

In a further aspect, the invention relates to a computer system comprising a DBMS and a service manager operatively coupled to the DBMS. The service manager is configured to register multiple services automatically and dynamically at runtime of the DBMS at the service manager, the services respectively being configured to process data that is stored in or is received for being stored in a database managed by the DBMS. The service manager is further configured to automatically manage dependencies between different ones of the multiple registered services.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Embodiments of the invention may have the advantage of providing a system and method for managing multiple services in a DBMS that increases the flexibility and maintainability of the system and that reduces the resource consumption, in particular in the context of using lazy instantiation for some of the services. Some or all of the technical disadvantages associated with state-of-the art service management methods may be avoided.

Embodiments of the invention may allow to dynamically load libraries respectively comprising one or more services at runtime to the DBMS and instantiate the new services in the DBMS without the need to manually modify a central file and/or to re-compile code.

Embodiments of the invention may be advantageous as many technical downsides of state-of-the-art service management approaches that are based on a single, central list of services supported by a DBMS may be avoided: any service added to the DBMS automatically and at runtime registers itself at the service manager. Hence, it may not be necessary to modify and recompile any source code. Furthermore, as the service manager automatically maintains the dependencies of the services, including the dependencies of the dynamically added services, it is ensured that all services required by a particular service are instantiated by the service manager before the said particular service is instantiated. This may allow avoiding the instantiation of too many services per default to avoid errors during instantiation of services, because the dependencies are managed by a service manager adapted to register new services automatically and at runtime of the DBMS.

According to embodiments, the method further comprises: during registration of one of the services at the service manager, automatically identifying, by the service manager, one or more other services required by the one service to be registered; and updating the dependencies between the multiple registered services, the service to be registered and the services identified during the registration of the one service such that the dependencies also comprise the dependencies of the service to be registered and of the required other services.

For example, the one or more other services required by a particular service to be registered can be specified within the said particular service, e.g., in the source code of the service and/or can be dynamically provided by a function of the said particular service to the service manager. For example, the function can be a getRequiredServices function that returns a list of strings having been created by the service configured to convert the class names of the required services specified, e.g., in the source code of the service or service-associated class files into respective strings. These strings may be used as arguments by the service manager for registering the required service and optionally also for instantiating a required service dynamically before the particular service is instantiated.

This may be advantageous as the class names of the one or more services required by the one service to be registered are explicitly or implicitly specified within the service itself, not in a centrally managed configuration file. This may ensure that a global management of the dependencies of many hundreds or even thousands of services in a central file can be avoided. The automated conversion of a class name of a service into a string used as argument by the service manager for managing (registering, initializing, and/or shutting down) a service may be beneficial as it may guarantee a canonical and deterministic use of service names.

According to preferred embodiments, the getRequiredServices function is configured, upon being called, for: converting the class names of the one or more required services into a respective string; converting the one or more strings into a compiler-checkable object; and returning the compiler-checkable object to the service manager having called the getRequiredServices function.

The use of an automated conversion of a class name that is specified in the source code of a class into a data object of a type known to a compiler may enable a compiler at compile time and optionally at design time to check if a particular service was referenced correctly. This may help avoiding typing errors, cyclic service dependencies, and/or service name duplications during programming/software development.

In case the dependencies of a particular service changes, there is no need to update a central service repository of the DBMS or to recompile the source code of the DBMS. If a service is modified such that it in addition requires a particular analytical or mathematical service library, the source code of the service may need to be modified and recompiled anyway. However, according to embodiments of the invention, loading an additional service to the DBMS as such does not require any manual modification or recompilation of a central service repository. To the contrary, in some state-of-the-art systems, the source code of the service and also the source code of the DBMS comprising a central list of services or at least this central list of services would have to be updated.

According to embodiments, the service manager is adapted to register the dynamically loaded services and to instantiate one or more of the newly loaded services in proper sequence in accordance with a dynamically updated data structure comprising the dependencies of all services registered at the service manager. Services can be instantiated and shut down dynamically as needed without the need to manually update any source code or a central configuration file. For example, the service manager can be configured to dynamically load a library comprising one or more new services at runtime of the DBMS into the DBMS. The library is loaded to the DBMS in order to ensure that a particular action can be performed, e.g., an OLAP analysis of some data, e.g., a particular statistical clustering analysis. The loading of the library may be triggered by an explicit user action. The new services in the loaded library may have dependencies on other services that may or may not be part of the loaded library and/or of the totality of services already registered. The loading of the service library at run time can automatically trigger the registration of the services contained in the loaded library via their service classes and interfaces. In some example examples, the source code of the services comprises calls to constructor methods or other methods (also referred to as "functions") which trigger the instantiation of other, required services. The service manager can be configured to call a getRequiredServices method of any service to be registered during the registration process for identifying the dependencies of the service to be registered. The service manager is configured to update the dependencies of the totality of services managed by the service manager.

Embodiments of the invention may have the further advantage that the service manager does not have to be aware of all services when the service manager or the DBMS starts. Rather, services can be added on demand later. A service loaded dynamically into the DBMS interacts with the server manager during the loading and registration process such that the registration is performed automatically and that a callback mechanism is provided that allows for arbitrary ways to instantiate services and introduce/register further dependencies. A central configuration file or class where all services have to be registered up-front via hard-coding them in the source code may be avoided, thereby greatly increasing the flexibility and maintainability of the system.

According to embodiments, the management of the dependencies comprises instantiating the services in accordance with the dependencies such that all services required by a particular one of the services is already instantiated when the particular service is instantiated by the service manager.

According to embodiments, one or more of the services are lazily instantiated services.

According to embodiments, at least some of the multiple services represent steps within a workflow of a product manufacturing process. At least some dependencies represent equipment dependencies, workflow dependencies, material dependencies and/or supply-dependencies of physical objects involved in or processed by the product manufacturing process.

For instance, the DBMS can be used for managing one or more databases comprising data generated and used by an Enterprise Resource Planning (ERP) system. A core function of many ERP systems is "Material Requirement Planning" and "Manufacturing Resource Planning".

Material requirements planning (MRP) comprises computational tasks, such as production planning, scheduling, and inventory control used to manage manufacturing processes. An MRP system or sub-system typically implements one or more of the following functions: ensure materials are available for production and products are available for delivery to customers; maintain the lowest possible material and product levels in store; and plan manufacturing activities, delivery schedules, and purchasing activities.

Manufacturing resource planning (MRP II) comprises computational tasks involved in the effective planning of all resources of a manufacturing company. It may address operational planning in units, financial planning, and may comprise a simulation capability to answer "what-if" questions and extension of closed-loop MRP. An MRP II system or sub-system typically implements one or more of the following functions: generation and updating of master production schedule (MPS), management of item master data (technical data), management of production resources data and other technical manufacturing data, Material requirements planning (MRP), capacity planning or capacity requirements planning (CRP) and others.

Nowadays more and more manufacturing companies no longer produce goods unchanged and unmodified for a longer period of time ("on stock"). Due to frequent changes in customer demands, those firms have to be able to adjust their production processes quickly and easily, following whatever new directions their customers preferences are heading to. Especially when customers prefer the opportunity to "design" the product they want to buy, such as when a car manufacturer allows for changing a plethora of features during the ordering process so that the finally delivered car is almost unique, the planning of the manufacturing process and management of the required resources are getting very complicated and hard to maintain. Various functions of an MRP or MRP II system or sub-system can be implemented as services that are an integral part of a DBMS or that are loaded later to the DBMS, e.g., in the form of program libraries. The time when a library is loaded and the services contained therein are registered and/or instantiated may unpredictable. Hence, an ERP system may comprise many hundreds or even thousands of services whose management is a highly complex task.

Embodiments of the invention may also allow orchestrating a huge number of services whose number and relative dependencies cannot be foreseen in advance in a manner that a proper manufacturing process is ensured. The management and updating of dependencies in planning of material and resources for the manufacturing process will become much easier as the service registration is performed decentrally based on an automated and dynamic registration of the individual services and their respective dependencies at the service manager. No central list of registered services needs to be maintained manually.

According to further embodiments, at least some of the services managed by the service manager comprise services for shutting down and restarting services and processes in a workflow of a manufacturing plant. The service dependencies specified within the individual services that are automatically extracted or otherwise automatically received dynamically by the service manager reflect the dependencies of the physical requirements and dependencies of the individual processes for shutting down and restarting the services and processes of the manufacturing plant. The service manager automatically coordinates temporary shutdowns and return to service of the manufacturing plant, e.g., for performing maintenance or service tasks. In many plants, it is necessary to shut down or start-up systems in a specific sequence in order to allow upstream systems to come offline or online. For example, at a beverage production maintenance, it is critical to start up systems that supply water before those that convert water to a high-pressure steam, followed by those that generate clean steam. All steps involved in a planned temporary shutdown are orchestrated by the service manager in an efficient manner in order to avoid a breakdown of the workflow, to avoid damage to the machines involved in the manufacturing process and to avoid a deterioration of the quality of the manufactured goods. Any breakdowns along the way may have a domino effect that puts schedule and budget at risks. Giving the complexity and size of such manufacturing plants, orchestrating all dependencies among the equipment, consumables, products, parts and processes is not a trivial activity. Embodiments of the invention may allow representing physical objects, e.g., equipment, goods, intermediary products or machine as a service that is loaded into the DBMS. Each new equipment, each dynamically generated product or intermediary product and the respectively required other physical objects (machines, parts, other intermediary products or consumables) can be specified in the form of service requirements in the respective service. Hence, when the services loaded into the DBMS are automatically registered at the service manager, a highly dynamic adaptation of the workflow and the orchestration of the instantiation of the individual services and workflow tasks can be performed. Based on a manually curated central list of services, the flexibility required by modern, highly dynamic manufacturing processes could not be achieved. Preferably, all or at least many services are implemented as singletons.

According to embodiments, the management of the dependencies comprises shutting down one or more of the services in accordance with the dependencies such that before any one of the one or more services is shut down, the shutdown of this one service is delayed until all services depending from the said one service are shut down.

This may ensure that the shutting down of a service does not negatively affect other services which may depend from the service to be shut down. For example, in complex manufacturing processes there is a risk that the shutdown of a particular process would break another process but a human operator may not be aware of this dependency. Embodiments of the invention may ensure that an undesired shut down or failure of, e.g., a complex manufacturing process caused by an erroneous shutdown command of a human operator is prevented, because the shutdown of the service is delayed until no other service needs it any more.

According to embodiments, each of the services is implemented in accordance with a singleton design pattern. For example, each of the services can be implemented as a singleton.

This may reflect the fact that the machines, consumables, products, and intermediary products involved in a manufacturing process are also considered "physical single instance objects".

According to embodiments, the dependencies of the services are represented in the form of one or more directed acyclic graphs (DAGs).

This may have the benefit that a graph, e.g., a tree, can be traversed quickly and cyclic dependencies can be detected easily.

According to embodiments, the dependencies of the services are represented in a single data structure that is managed and continuously updated at runtime of the DBMS by the service manager. An update of the dependencies is performed in particular when a service is newly registered at the service manager.

According to some embodiments, one or more or all of the multiple services comprise a "getServiceInstance". The method is accessible by the service manager and enables the service manager to check whether a private member, a cached singleton service instance, has already been initialized. If it has, the existing service instance is returned straight away to the service manager. If not, a new service instance is created, placed into the member variable, and returned to the caller (e.g., the service manager) just-in-time for its first use.

According to embodiments, the method comprises adding an additional service to the DBMS. The adding comprises registering the additional service at runtime of the DBMS at the service manager and automatically updating the dependencies of the services such that the dependencies represent the dependencies of the existing and the additional service.

For example, the registering of the additional service can be part of a program library that may comprise further services. The library is loaded at runtime of the DBMS into the DBMS such that other services can make use of the services contained in the library and/or such that services in the library can make use of services that are already instantiated by or at least registered at the service manager.

According to embodiments, the registration of the services at the service manager is implemented in the form of a decentralized registration process. Using a decentralized registration process means that neither the DBMS nor any other system functionally coupled to the DBMS comprises or uses a list of registered services that is created and maintained manually.

According to embodiments, the dependencies of the services are specified within the services, e.g., within the source code of the services, and are communicated to the service manager upon registration of the services at the service manager. For example, the source code of a class file implementing the services can comprise a list of class names of one or more other services required by this service. The service manager is configured to parse the list upon registration of the at least one service and to update the dependencies in accordance with the parsed list.

In addition, or alternatively, each of the multiple services comprises a function for registering the service at the service manager. For example, the service class implementing the service or an interface class that is implemented by the service can comprise this function. The function used for service registration can be, for example, a "registerService" function.

According to embodiments, each of the multiple services comprise an instantiateService function and a shutdownService function. The instantiateService function and the shutdownService function are accessible (i.e., can be called) by the service manager. For example, these functions can be public functions. The method further comprises: using, by the service manager, the instantiateService function and the shutdownService function of the multiple services for dynamically orchestrating the instantiation and shutdown of the multiple services in accordance with the dependencies. Preferably, the instantiateService function and the shutdownService of the multiple services managed by the DBMS is identical, i.e., has the same function name and the same list of arguments, while the concrete implementation may differ from service to service. This eases the maintenance and management of a large number of services because the service manager can automatically control the instantiation and shutdown of a large number of services with a small number of commands.

According to embodiments, each of the multiple services comprise a getRequiredServices function. The getRequiredServices function are accessible by the service manager. The getRequiredServices function is configured to return the names of one or more required services. Each required service is a service that needs to be instantiated before the said service comprises the getRequiredServices function is instantiated. The registration of each of the multiple service comprises calling, by the service manager, the getRequiredServices function of the service to be registered; automatically checking if the names of the required services returned by the getRequiredService function identify an already registered service; and automatically performing, by the service manager, a registration of any service returned by the getRequiredService function that has not yet been registered service.

For example, the service manager may search the name of a required but not yet registered service in a local or remote service library.

According to embodiments, the execution of the getRequiredServices function comprises: converting the class names of the one or more required services into a respective string; converting the one or more strings into a compiler-checkable object; and returning the compiler-checkable object to the service manager having called the getRequiredServices function.

In effect, the getRequiredServices functions converts the identified class names in a standardized ("canonical") fashion that may even allow for automated object type checking by a compiler.

According to some embodiments, the service manager is configured to call the getRequiredServices function of any one of the multiple services also before instantiation of the service. The service manager is configured to check if the names of the required services returned by the getRequiredService function identify an already instantiated service; and automatically call, by the service manager, the instantiateService function of the identified required service returned by the getRequiredService function that has not yet been instantiated. However, in other embodiments, the service manager does not call the getRequiredService function in preparation of instantiating the service as all dependencies of the services managed by the service manager have already been identified during the registration process and have been stored in separate data structure, e.g., a directed acyclic graph, a tree, or a set of trees. The service manager is configured to analyze this dependency data structure before a particular service is instantiated and to automatically instantiate all services required by the service of interest to be instantiated before the service of interest is instantiated. This may have the advantage that each service only needs to specify a limited set of required services and does not have to care about dependencies on the second and third level, i.e., does not have to specify also the services required by the "required services" because these second and third level requirements are automatically considered and integrated into the global dependency data structure by the service manager when the required services are registered.

According to embodiments, the service manager is configured to update the dependencies at least upon registering a service. Updating the dependencies comprises updating the dependencies between the multiple registered services, the service to be registered and the "required" services identified during the registration of the one service such that the dependencies also comprise the dependencies of the service to be registered and of the required other services.

The dependencies can be stored in one or more data structures managed by the service manager. The data structure can be, for example, a directed acyclic graph or a set of directed acyclic graphs. In other exemplary embodiments, the data structure representing the dependencies can also be a list or a set of lists or any other type of data structure suitable for encoding dependencies of multiple services.

According to embodiments, at least one of the multiple services specifies one or more other services required by the at least one service. These services are also referred to as "required services". The specification of the one or more other services can have the form of a list of class names that are checked by a compiler during compile time. An error is thrown upon compiling a service class in case the service class comprises a name of a required service and the compiler cannot identify a class whose name matches the name of the required service.

State-of-the art service management systems (e.g., the "code project", available online via https://www.codeproject.com/Articles/5794/Registry-of-Singletons) do not handle automatic registration of services and do not take care of managing dependencies between them. In addition, those systems identify services by a string, i.e., an expression in a source code or another file that is specified in a syntax that cannot be checked by a compiler configured for compiling the service. The problem associated with the use of strings for uniquely registering services is that each string representing a service has to be globally unique. Furthermore, any typo may result in an error that cannot be identified before the service source code is compiled and tested. Hence, using non-typed strings for specifying the names of required services in the source code of a service is error-prone and can lead to situations where bugs are found rather late (if at all).

To the contrary, the above-mentioned embodiments of the invention use the class names of other services directly and convert them into a compiler-checkable object that may be indicative of one or more required services. This means that the source code of a particular service comprises a list of the class names of the one or more other services required by the particular service. The class names are contained in the source code of the particular service in a syntax that forces the compiler to check if the class name is identical to the class name of one of the totality of registered services. By specifying required services in the source code of a service using the very same identifiers that the compiler itself uses may have the advantage that references to invalid services can already be checked by the compiler at compile time and optionally already at design time. The compiler will throw errors during compile time or create underlinings or other forms of text highlighting effects at design time in case an unknown service class name is contained in a currently compiled or modified code of a service class.

According to embodiments, the design time environment used for programming a service is adapted to use the compiler to identify at design time of a service a service source code section mentioning a service class name that does not match with an existing service class known to the compiler. In this case the design time environment is configured to automatically highlight the service class name in the source code of the service class upon design time.

This may be advantageous because typos and other errors resulting in a mismatch of the name of a required service specified in the source code of a service and the actual name of the class representing and/or implementing the required service is automatically detected already at design time. This may greatly accelerate the service development process because errors are identified automatically and at the earliest possible stage.

According to embodiments, the service manager is a component of an application that is implemented as an extension application (add-on or plug-in) of the DBMS or is an integral component of the DBMS.

For example, the integral component of the DBMS can be a program component or function that is part of the core functionality of the DBMS and that is provided as part of the DBMS as originally provided by the DBMS developer or supplier. Providing the service manager as an integral part of the DBMS may be beneficial, because the DBMS already provides support for automatic and dynamic registration and dependency checking of new services to be loaded into the DBMS.

Providing the service manager as a plug-in or add-on of the DBMs may be beneficial, because this allows supplementing an existing DBMS with the ability to automatically and dynamically load new services into the DBMS such that their dependencies from other services are automatically considered and integrated into the dependencies of existing services.

According to embodiments, the method further comprises:
a) receiving, by the DBMS, a service request for a particular service;

b) identifying, by the service manager, the requested service within the multiple services;

c) identifying, by the service manager, one or more other ones of the registered services required by the requested service;

for each of the identified one or more other services:
i. check if this other service is already instantiated;
ii. if this other service is already instantiated, go to the next service identified in step c;
iii. if it this other service not yet instantiated, instantiate this other service and go to the next service identified in step c.

This may be beneficial as the service manager is adapted to ensure that any service that may be instantiated lazily in response to a user request submitted to the DBMS can be instantiated without a program failure caused by non-instantiated but required other services.

According to some embodiments, the service manager is configured to store the dependencies in a data structure having a logical sort order as defined by the dependencies. The logical sort order of the services in the data structure representing the service dependencies can be used for orchestrating the instantiation and shutdown of the multiple services managed by the service manager. For example, the topological sort order can be determined explicitly with well-known algorithms, or implicitly by doing a depth-first-search like specified in the pseudocode described in the two previous paragraphs.

The term "lazy initialization" as used herein is the tactic of delaying the creation of an object, in this case a service, until the first time it is needed. It is a kind of lazy evaluation that refers specifically to the instantiation of objects or other resources. Providing lazily instantiated services can improve startup speed of the DBMS as the impact of object instantiation is spread in time rather than concentrated in the startup phase of a system, and thus median response times can be greatly improved.

The term "service" as used herein relates to a software functionality or a set of software functionalities with a purpose that different clients or different program routines acting as a client can reuse for different purposes. Preferably, a "service" is a software functionality for processing data that is currently stored in a database managed by a DBMS and/or that shall be stored in the database managed by the DBMS. For example, a service can be a clustering algorithm adapted to cluster digital pathology images. Another service could be a principal component analysis service that is configured to identify a subset of parameters in a data set that is highly predictive of a particular feature of interest. A further example for a service could be a particular form of report, e.g., a report indicating the number of consumables used during the production of a particular good, the amount of energy and water consumed in a particular manufacturing step, or the like. The report can be specific for a particular user or user group and/or may depend on other factors. The report may be generated dynamically by analyzing data, e.g., manufacturing-associated data, stored in the database. According to embodiments, a service may comprise an interface allowing a user or another software function to call the service.

A "registered service" as used herein is a service whose name (or other identifier) and dependencies from other services (if any) has been communicated to the service manager. As a consequence, the service manager has integrated the registered service and its required services, if any, in a data structure used for representing the dependencies of all registered services.

A "service manager" as used herein is a piece of software configured to manage a plurality of services. The piece of software can be a standalone application, a program module, a program routine, a program function, a software class or a combination of two or more of the foregoing.

A "compiler checkable object" as used herein is a data object having assigned a type, e.g., a particular object class, and optionally additional features that enables a compiler to perform one or more consistency checks during compile time and optionally also during design time. A consistency check can comprise, for example, a check if the type assigned to the data object is contained in a list of object types known to the compiler.

A "database" as used herein is a collection of electronic information ("data") that is organized in memory or on a non-volatile storage volume in the form of a particular, defined data structure which supports or is optimized for data retrieval by a particular type of database query. The data is typically logically organized in database tables. A database can in particular be a relational database, e.g., a column-oriented database or a row-oriented database.

A "database management system (DBMS)" as used herein is a software application designed to allow the definition, creation, querying, update, and administration of databases. Examples for DBMSs are IBM Db2 for z/OS, MySQL, PostgreSQL, IBM Db2 Analytics Accelerator (IDAA), and others.

A "database query" or "query" as used herein is a command to retrieve, update, store and/or analyze data stored in a database managed by a DBMS, the command being specified in the syntax of the interface of the DBMS. For example, the syntax can be SQL.

A "table" as used herein is a database table managed by a DBMS.

A "module" as used herein is a piece of hardware, firmware, software or combinations thereof configured to perform a particular function within an information-technology (IT) framework. For example, a module can be a standalone software application, or a sub-module or sub-routine of a software application comprising one or more other modules.

A "singleton pattern" as used herein is a software design pattern that restricts the instantiation of a class to one "single" instance and that provides global access to that instance. Accordingly, a "singleton" is a software object implemented such that it is ensured that only one instance of a particular type of software object, (e.g., of a particular type of service represented and implemented by said software object) can be instantiated at a time.

Figure 1:
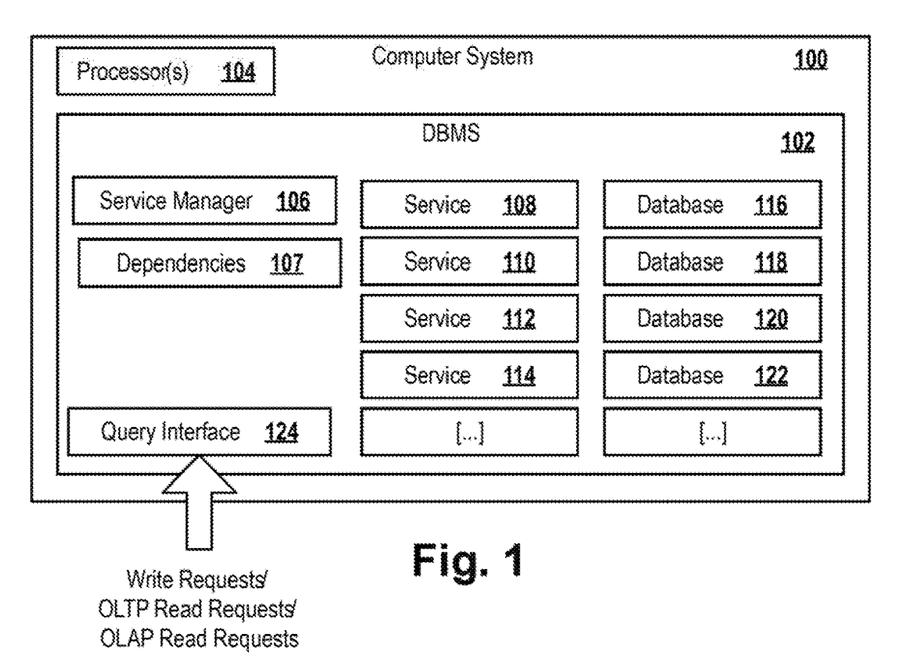
FIG. 1 depicts a computer system comprising a DBMS and a service manager.

FIG. 1 depicts a computer system 100 comprising one or more processors 104 and a DBMS 102. For example, the computer system can be a standard computer system, e.g., a desktop computer system or a server computer system or a distributed computer system, e.g., a cloud computer system. The DBMS can be a DBMS of any type. For example, the DBMS 102 can be a relational DBMS. The DBMS can be a column store DBMS, a row store DBMS, a hierarchical DBMS, or the like. For example, the DBMS can be one of the following DBMSs: IBM Db2, MySQL, Oracle, PostgreSQL, IBM's Db2 Analytical Accelerator for Db2 (IDAA), or the like. the computer system comprises a service manager 106 that is operatively coupled to the DBMS 102.

The computer system 100 further comprises a service manager 106 that is operatively coupled to the DBMS.

The expression "service manager operatively coupled to a DBMS" as used herein can mean, for example, that the service manager is functionally an integral part of the DBMS because it is configured to manage services that use the DBMS as the respective runtime environment.

Figure 3:
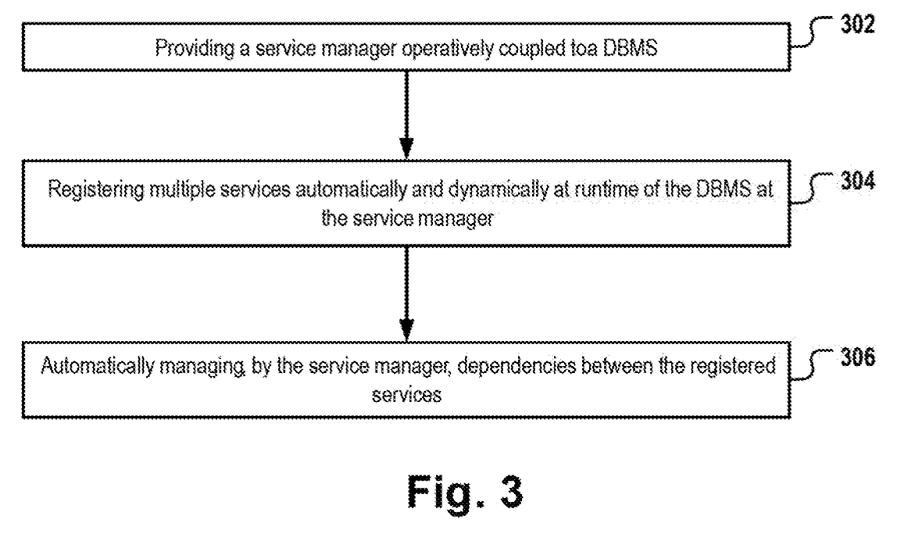
FIG. 3 is a flow chart of a method for managing services in a DBMS.

The service manager is configured to perform a method that is illustrated in FIG. 3 and that is described in the following by making reference to elements of both FIGS. 1 and 3.

The service manager 106 can be provided in step 302, e.g., as an integral component of the DBMS by installing and instantiating the DBMS. Alternatively, the service manager can be provided in step 302 after the DBMS has been instantiated. For example, the service manager can be contained in a plug-in or an add-on of the DBMS and the functionality of the service manager is provided when the said plug-in or add-on is installed and instantiated on the computer system 100.

The service manager 106 is configured to register in step 304 multiple services 108-114, 208-214 automatically and dynamically at runtime of the DBMS at the service manager. For example, when a new program library comprising one or more services is loaded to the DBMS, the services contained in the library are automatically registered at the service manager. In addition, or alternatively, when the DBMS is instantiated, the services that are an integral part of the DBMS are automatically registered at the service manager 106. Each of the services is a piece of program logic ("software") configured to process data that is stored in or is received for being stored in one of the one or more databases 116-122 managed by the DBMS 102.

The service manager 106 is configured to automatically manage in step 306 dependencies 107 between different ones of the multiple registered services. For example, during registration of a new service, the service manager identifies one or more other services required by the service to be registered, and updates the dependencies such that the updated dependencies also reflect the service dependencies of the service that is currently registered. Likewise, if a service is unregistered, the dependencies are updated as well. The dependencies 107 can be, for example, a data structure that is managed by the service manager and that is accessible only by the service manager. For example, the dependencies 107 can be a tree or a set of trees, wherein the nodes represent services and wherein an edge connecting a parent node with a child node represents a dependency between a service represented by the parent node and a required service represented by the child node. The service manager can be configured to ensure that the services represented by all direct and indirect child nodes of a particular node are instantiated before the service represented by the particular node is instantiated.

The services 108-114 can comprise one or more daemons and one or more services that can explicitly be called by a user or a function of the DBMS. Each of the services can be implemented as singleton however, any other software pattern that ensures that only one instance of a service can be instantiated at a time may likewise be used, so the singleton design pattern is not the only possible implementation option.

For example, the services can comprise a catalogue manager service that is configured to trace and inquire the settings of various configuration parameters in IBM's IDAA. The services can further comprise a tracer service and a configurator service which are used by the catalogue manager service for providing the above-mentioned functionalities "tracing" and "configuration". The tracer service depends from the configurator service. This means, in order to start and use the catalogue manager service, it is mandatory that the tracer service is already instantiated. However, as the tracer service depends from the configuration service, it is necessary that the configuration service is instantiated first, then the tracer service, and finally the catalogue manager service. The often-complex dependencies between different services make it important to instantiate the services in proper sequence.

According to a state-of-the-art approach, the proper order of service instantiation is ensured as follows: a central class "Initializier" is provided where a hardcoded line appears in the source code for each of the services of the DBMS:
"registerService<Configurator>( );
registerService<Tracer>( );
registerService<CatalogManager>( );

However, the use of a central class for globally instantiating the services in proper order in accordance with the above-mentioned state-of-the-art approach does not ensure a proper sequence of instantiation. For example, lazy instantiation of some services in dependence on user requests may be received in an unpredictable temporal order. In case a service is added to the system at runtime, e.g., by loading a library to the DBMS, it is necessary to update the source code of the central class and recompile the class and potentially the whole DBMS. Some services that do background operations (so-called "daemons") require an explicit, external trigger to be instantiated. In addition, a central class or other piece of source code that explicitly specifies the order of service instantiation events will become too complex to maintain if the number of services exceeds a certain threshold. For example, cyclic dependencies between multiple services may arise and may cause errors at runtime which are difficult to identify. Maintaining such a central registry is a burden and developers often take steps to avoid it. For example, instantiation chains were built by instantiating one or more services as part of the instantiation of some other service. That leads to a (partly) manually coded dependency graph between all services and, thus, to a more complex and harder to maintain code.

To the contrary, according to embodiments of the invention the services register themselves at the service manager dynamically at runtime of the DBMS. The service manager handles and orchestrates the instantiation and shut down of all services of the DBMS 102 in a thread safe fashion for example, the service manager and each of the services can run in a separate, single thread, respectively. During instantiation and shutdown of each of the services 108-114, the service manager 106 ensures that dependencies between the services are adhered to. The automated registration of the services at the service manager and the automated updating of the dependencies ensure that the DBMS can support a large number of services. A further technical benefit of the automated registration and dependency update is that all code accessing any registered service can always rely on the service being available. No performance overhead is incurred for checking and lazily instantiating the service.

Preferably, each of the services is implemented as a singleton meaning that a single software object is created and made available for subsequent use by others services or functions of the DBMS.

Figure 2:
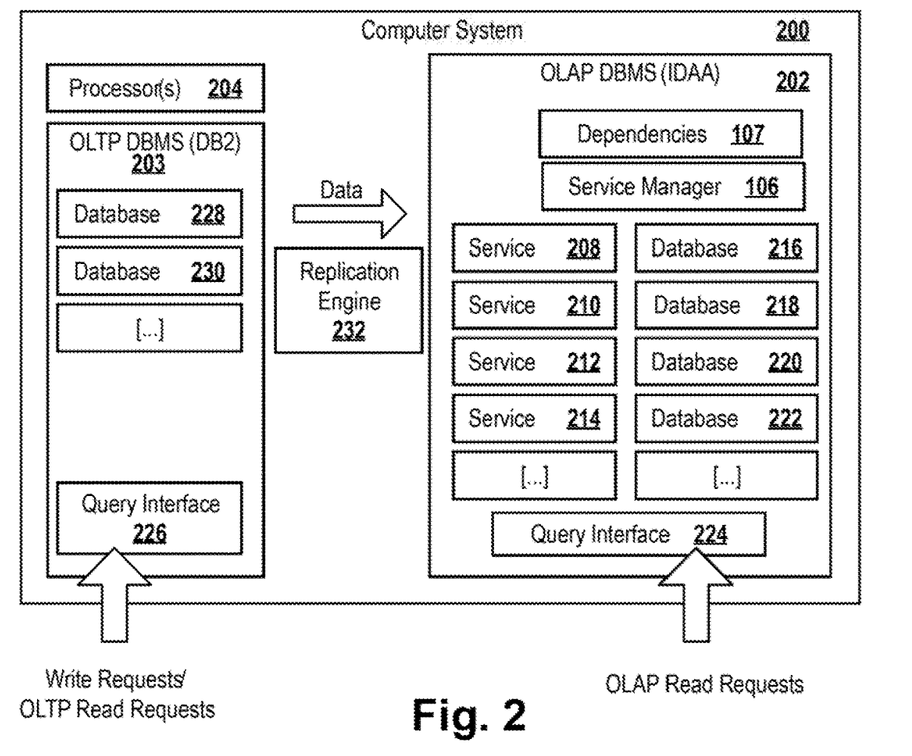
FIG. 2 depicts a further computer system comprising a DBMS and a service manager.

FIG. 2 shows an alternative embodiment of a computer system 200 comprising a service manager 106 and a DBMS 202. The system 200 comprises one or more processors 204, an OLTP DBMS 203, e.g. IBM's Db2, and an OLAP DBMS, e.g., IBM's IDAA 202. The two DBMSs 203, 202 can be hosted on the same computer system 200 or on different computer systems. The OLTP DBMS 203 comprises a query optimizer that is optimized for performing write queries while the OLAP DBMS 202 comprises a query optimizer that is optimized for performing analytical read queries. The OLTP DBMS 203 can be, for example, Db2 for z-OS, an Oracle database, a PostgreSQL or MySQL DBMS or the like. The OLAP DBMS 202 can be, for example, IDAA. The computer system 200 can comprise a replication engine 232 that is configured to replicate data that has been stored in a database 228, 230 of the OLTP DBMS to a database 216-222 of the OLAP DBMS. The computer system can further comprise a query dispatcher module configured to analyze any database query accessing the OLTP DBMS 203 and forward some of the queries, in particular complex analytical queries, to the OLAP DBMS. The query dispatcher tries to predict whether the query can be executed faster or with less computational resources on the OLAP DBMS than on the OLTP DBMS. In this case, the query dispatcher forwards the database query to the OLAP DBMS for execution. The client having submitted the query will typically not be informed of whether the query was executed on the OLTP DBMS or the OLAP DBMS. The OLAP DBMS can comprise a plurality of services 208-214 respectively configured to perform an analytical query such as a statistical evaluation, clustering and classification tasks, image segmentation, complex reports for different users, purposes, and subsets of data, and the like.

The OLAP DBMS 202 can comprise several hundred or even several thousand services 208-214. Some of the services can be an integral part of the DBMS 202 from the beginning. Other services can be loaded to the DBMS later, e.g. when the owner of the DBMS 202 decides to perform some type of data analysis task which are not covered by the already integrated services. The service manager 106 is adapted to manage and maintain a huge number of services and their respective interdependencies 107 fully automatically, thereby ensuring that the DBMS 202 and its services operate stable and also ensuring that errors associated with a manual specification of the dependencies and/or of the chronological sequence of service instantiation can be avoided.

FIG. 3 depicts a flowchart of a method for managing a plurality of services in a DBMS that was explained already in the figure description of FIG. 1. For example, step 302 can be performed by installing a DBMS that already comprises the service manager 106 or by installing a plug-in comprising the service manager using the already installed DBMS 202 as runtime environment.

In one embodiment, the DBMS 102, 202 is started. Starting the DBMS comprises loading one or more service libraries to the DBMS and starting the service manager 106. The next step, the service manager registers the services that are contained in the libraries loaded at startup of the DBMS 102, 202. The registration process comprises the identification of dependencies of each service to be registered and the storing of all identified dependencies in a central dependency data structure 107 that is maintained by the service manager. Thereby, the service manager checks that no cyclic dependencies occur in this data structure 107. In addition, further initialization steps during startup of the DBMS can be performed.

After the DBMS 102, 202 has started, the service manager 106 is adapted to instantiate individual services as needed. For example, the service manager can comprise a user interface allowing a user to submit a query to perform a particular service directly to the service manager. In other embodiments, the service manager comprises an interface to the DBMS 102, 202 and receives a user's request for a particular service indirectly via the DBMS 102, 202. In this case, the DBMS 102, 202 comprises a respective user interface 124, 224. Typically, the user interface 124, 224 is a non-SQL interface enabling a user to request a particular service, e.g., a particular clustering algorithm, a particular report or the like. Not all services maintained by the service manager may be accessible or requested by a user. For example, some services can be background daemons that may be required by higher level services which actually are of interest for a user.

When the DBMS is instantiated, also some of the services can be instantiated automatically. The automated instantiation is managed by the service manager. For example, a main( ) method of the service manager or of another class calling the service manager may comprise a list of services that shall be instantiated automatically upon DBMS instantiation. The service manager evaluates the dependency data structure 107 for determining if one of these "early instantiation" services requires some additional services, and if so, automatically instantiate also these required additional services before the "early instantiation" services are instantiated. In case one of the additional required services is not yet registered at the service manager, the service manager is configured to search the name of the additional required service in a predefined local or remote repository, e.g., in a local or remote directory comprising a set of service libraries. The services found in the search are then automatically loaded into the DBMS and are automatically registered at the service manager. The dependencies of these newly and dynamically registered services are also automatically analyzed as described above and may trigger the automated searching and loading of further libraries from the predefined repository until all services required by the "early instantiation" services are automatically loaded to and instantiated in the DBMS by the service manager.

After instantiation of the DBMS, the DBMS may be used for processing database queries and data analysis tasks as known in the art. Then, the service manager may receive a request for a particular service from a user or from the DBMS or from any other client software. The requested service may not be one of the "early instantiated" services and hence may not be instantiated at the moment of receiving the query. The service manager evaluates the dependencies 107 between the requested service and the other services 108-114, 208-214 for identifying one or more required services which need to be instantiated before the requested service can start and operate correctly. In case the requested service requires a service that has not yet been registered at the service manager, the service manager starts searching the required service in the local or remote library repository and automatically loads and registers the required services found in the search. If a new service is registered, the dependencies 107 are updated to include the dependencies of the newly registered service(s). Then, the service manager automatically instantiates any one of the said required services and afterwards instantiates the requested service. The instantiated service is used for processing data stored in a database managed by the DBMS and for returning a data processing result as response to the service request.

The service manager can also automatically trigger a shutdown of a particular service. For example, a service S1 may represent a manufacturing step MS1 involving the use of a particular machine M for producing a first good G1. A service S2 may represent a manufacturing step MS2 involving the use of the same particular machine M for producing a second good G2. As the machine M cannot be used for producing the first good G1 and the second good G2 at the same time, the services S1 and S2 are mutually exclusive. If the service S2 is requested, it is necessary that the service S1 is shut down before S2 is instantiated. The service manager can, for example, delay the instantiation of S2 until S1 has completed and actively shutdown S1 as soon as good G1 was produced.

The identification of dependencies in the dependency data structure 107 and/or the updating of the dependency data structure 107 can be performed using a depth-first search over the dependency tree representing all dependencies of all services registered at the service manager.

Figure 4:
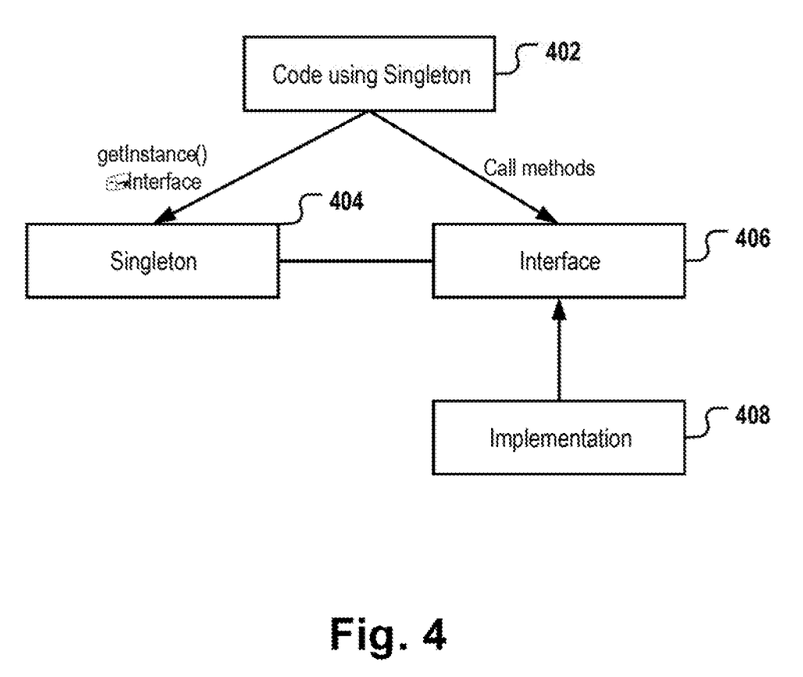
FIG. 4 depicts the dependencies of multiple services.

FIG. 4 depicts the dependencies of multiple services according to an embodiment of the invention. According to the embodiment depicted in FIG. 4, each service is implemented as a singleton class 404 comprising a getInstance( ) method which returns a reference to the single instance object of the respective service (singleton object). More specifically, the getInstance( ) method returns a reference to the interface 406, while the actual implementation 408 of the service is hidden. The set of classes and interfaces depicted in FIG. 4 do not enforce using interfaces in the calling code, but the architecture separates the interface 406 of a particular service from the fact that it is treated as a singleton. The separation between the singleton class 404, the interface 406 and the actual service implementation 408 as depicted in FIG. 4 is optional. The software architecture depicted in FIG. 4 has the benefit of a cleaner design, but a combination of the singleton 404, the interface 406, and/or the implementation 408 in a single class as possible. For example, the singleton 404 and the interface 406 could be combined, or the interface 406 and the implementation 408 could be combined, or all three of them. The separation of the singleton, the interface and the implementation allows using different implementations for the interface 406 that is handled as singleton. This facilitates software tests. For example, in case test objects ("mock objects") are used instead of the real implementation, the class design depicted in FIG. 4 allows providing different single instances for the singleton 404 in the test phase and in the "real" use case.

Figure 5:
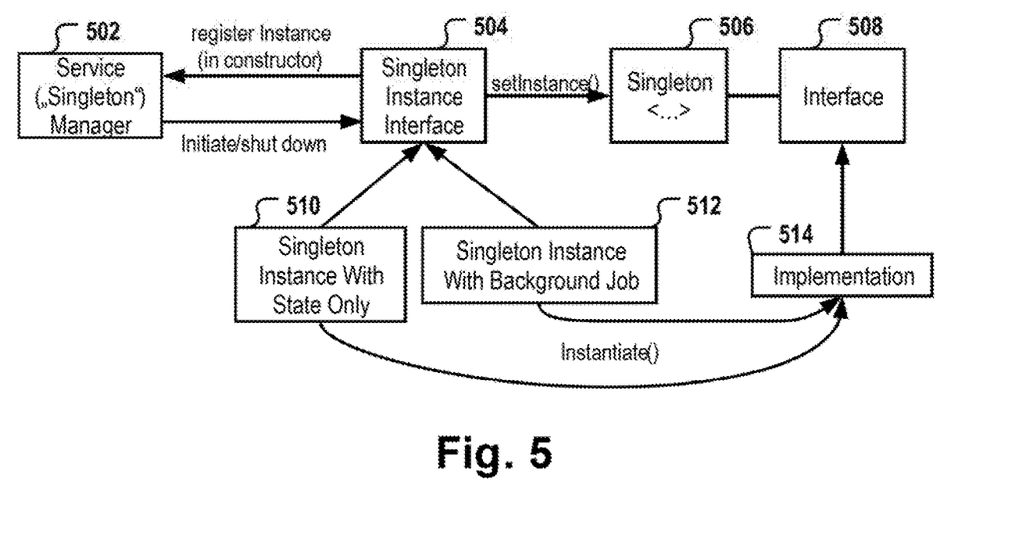
FIG. 5 illustrates the integration of services and the service manager in a larger system architecture.

FIG. 5 shows how the services and the service manager (whose classes and interfaces can be implemented e.g. as depicted in FIG. 4) can be integrated in the overall system architecture. The "Singleton Instance" 504, 406 knows about the Interface 508, 406 and the actual service implementation 514, 408. The singleton instance 504, 406 is responsible for registering itself with the service manager 502 (that may also be referred to as "singleton manager").

The service manager 502 has to "know" each service in order to control the instantiation and shutdown of the service in accordance with the requirements of other services. Since the service manager 502 takes care of the instantiation of each singleton 506 representing a service, the service manager has to know which implementation class shall be instantiated to create the single object for each service interface 508. Furthermore, each service singleton 506 registers itself with the service manager 502, e.g., upon being loaded into the DBMS or upon starting the DBMS.

The service manager 502 actually performs instantiation of the service singletons 506 and the resulting single instantiated service object is then stored in the singleton class 506 in order to complete the instantiation and enable subsequent access and use of the service. Different refinements may exist for services (corresponding to singleton instances), e.g., for services that use or are implemented as a background job 512 and for those that don't 510.

According to embodiments, this is accomplished by creating a single global variable in the source code of the service class or of another class functionally associated with the service. For example, the single global variable can be created right next to the code defining the implementation 514 (in the .cpp file of the implementation) of the service. The single global variable can also be created within the code defining the service (in the .cpp file of the service) to be registered. The single global variable represents a particular service to be registered at and managed by the service manager. When this variable is created during the start of the DBMS or DBMS-plug-in or add-on (or while a library is loaded), the constructor of the variable's type or class is executed. That constructor takes care of the registration of the service represented by the variable at the service manager. Thus, the service manager is aware of the service object and since the service-specific variable is a global variable, its existence is always guaranteed. So the service manager can access a particular service and its implementation to perform actions like instantiation, shutdown, and querying of the current state of the service using the specific implementation type.

According to preferred embodiments, each service knows which other services it requires. For example, the implementation class 514 of a service knows which other services it accesses in its code, because the class names of these other services are mentioned in the source code of the implementation class 514. These other services are also referred to "required services" of this service.

When a service is automatically registered at the service manager, the service manager calls the "getRequiredServices( )" function of the service to be registered in order to derive the dependencies of a non-registered service during the registration. In C++ code, the getRequiredServices function can have, for example, the following form:

```
Class MyImplementation: public MyInterface {
  public:
    using ServicePrerequisites = services::ServicePrerequisites <Tracer, MyOtherServices >;
    virtual auto doSomething()->void override {
    ...
    }
};
```

The "ServicePrerequisites" are a list of required services whose names can be checked by a Compiler at compile time and optionally also at design time. In addition to the "getRequiredServices" function, the service class can comprise methods enabling the service manager to initialize and shutdown the service represented and/or implemented by the service class. The service class acts as the central entry point for a particular service, although some functions of the service may in fact be implemented in other classes.

According to embodiments, the service dependencies that are automatically obtained by the service manager in response to the getRequiredServices( ) function call are used for automatically updating a data structure comprising all dependencies of all registered services.

According to embodiments, different service implementations are registered at the service manager and in addition the service manager is automatically notified of any change of the service implementation currently used at runtime of the DBMS. Alternatively, if the new implementation does not have any dependencies at all (as may be the case, e.g., for mock objects), it is possible to create the new single instance for a service and store it in the singleton class 506 using a method like: void setInstance( . . . ). The method can be performed by a Singleton service instance interface 504. This may be advantageous as no extra steps are required to ensure that the dependencies are all up-to-date.

According to some embodiments, during the instantiation phase, the service manager may determine that a particular service that is required (e.g., because of an explicit request of a user, or because another explicitly requested service depends from it) is already instantiated. In this case, the service manager will return a reference or a pointer to the existing service instance and will not create a further instance of this service. Furthermore, when an already instantiated service object is handed over to a calling process, the service manager does not check the dependencies of the requested service because the fact that the service is already instantiated implies that all of its dependencies must have been satisfied already.

According to embodiments, the registration of a new service at the service manager is performed automatically when the global variables for the singleton service instance of the new service are created during process startup—or when the respective libraries loaded for each service are instantiated. During the registration of the new service, the service manager adds a representation of the new service into a data structure 107 representing dependencies between the new and the already registered services. For example, the dependencies of the services can be represented in the form of a data structure comprising one or more directed acyclic graphs, e.g., a tree or a set of trees. The new service is represented as an additional node in this graph, wherein the position of the new node in the graph represents the dependencies between the new service and the existing services.

According to preferred embodiments, the service manager automatically analyzes the dependencies during the registration of a new service in order to determine if the dependencies of the new service would introduce cyclic dependencies. For example, various tree traversal algorithms may be used in order to check if the graph is free of cycles. In case a cyclic dependency is identified, the registration of the new service is terminated and an error event and/or a warning message is generated. Only in case the result of the analysis is that the new service and its dependencies does not create a cyclic dependency, the new service is registered and optionally also instantiated.

Since the service manager does not know the sequence of registering different services, a registration may identify a required service which has not yet registered at the service manager. In this case the dependency checking is postponed until the required service is also registered, and the registration of the required service is automatically triggered by the service manager. Postponing the checking of the dependencies for any cyclic dependencies is not a problem because the dependencies will be checked automatically later when the required service is registered.

In addition, or alternatively, the analysis of the service dependencies is performed during the instantiation phase of a service. If the dependency check is performed upon service instantiation rather than upon service registration, the loading of many different service libraries to the DBMS may be facilitated, because at the libraries may be loaded in an arbitrary order and will not trigger the generation of an error event or a warning message in case the libraries are loaded in a chronological order that does not match their logical dependencies. As the dependencies are checked only at service instantiation, the process of loading many different service libraries in an arbitrary order to the DBMS is facilitated as the operator of the DBMS does not have to consider logical dependencies during the loading process.

Figure 6:
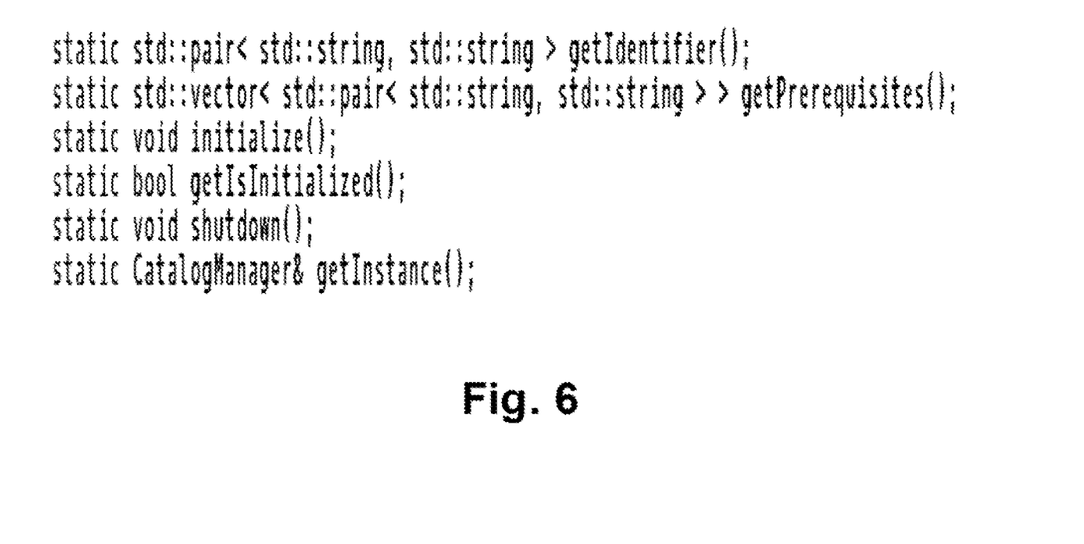
FIG. 6 depicts sections of a source code of a service class.

FIG. 6 depicts a part of the source code of a service class specifying a service implemented as a singleton, wherein the code comprises a definition of the service comprising static methods initialize( ), shutdown( ) and getPrerequisites( ), whereby the latter represents a getRequiredServices function. A downside of this implementation is that the required services are returned as strings and have to be specified in the source code as (non-typed) strings that are not checked by a compiler. A better implementation option is depicted in FIG. 7.

Figure 7:
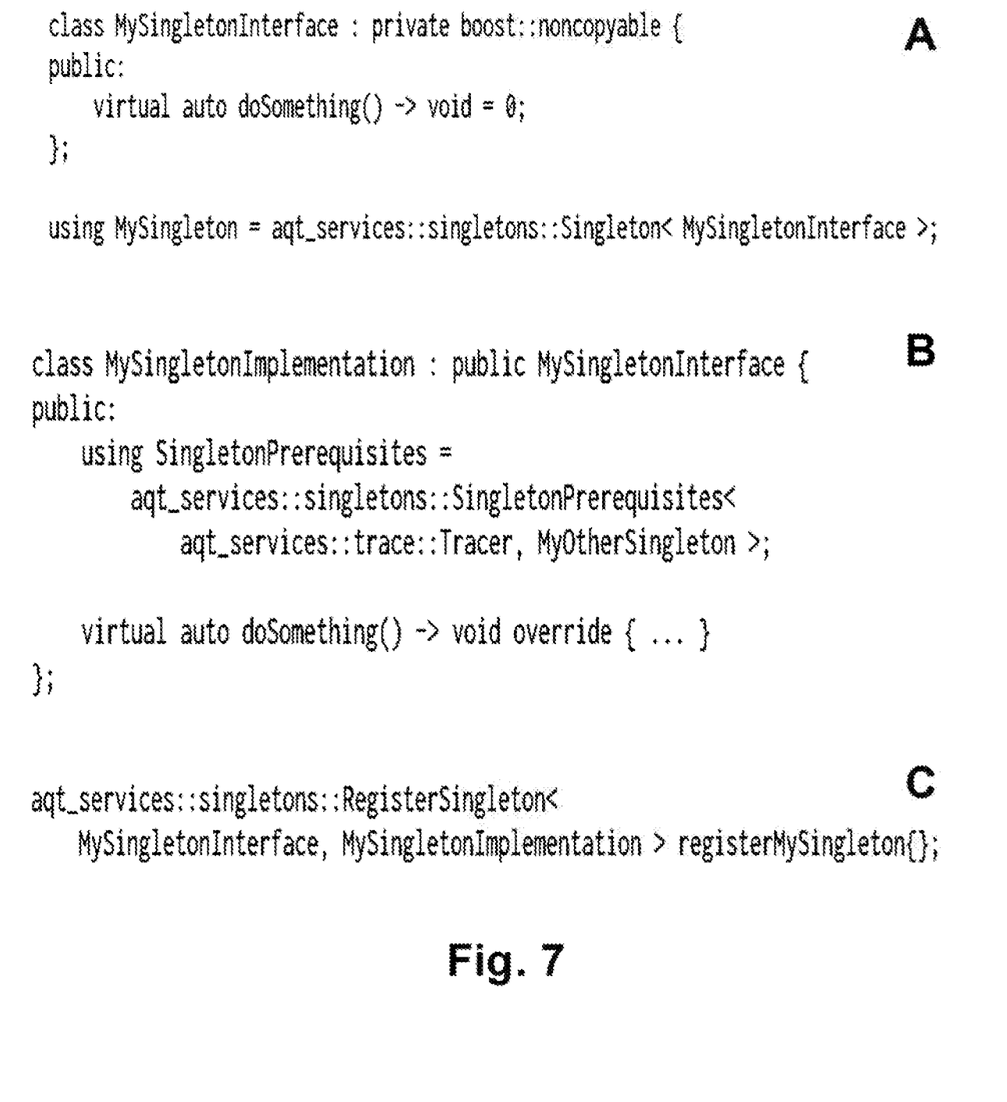
FIG. 7 depicts sections of source code of several object and interface classes used for implementing a service.

FIG. 7 depicts a part of the source code of a more preferred representation of a service. FIG. 7A shows an abstract interface that is implemented by a service implementation class whose source code is partially depicted in FIG. 7B. The service is implemented as a singleton whose implementation must define a getRequiredServices method configured to return a compiler-checkable object of required services. This compiler-checkable object is called "SingletonPrerequisites" in this example. The service manager initializes and shutdowns a service via methods of the abstract interface depicted partially in FIG. 7A. These methods may be static methods like initialize( ), shutdown( ) that are inherited by the service class. A method that returns a compiler-checkable object instead of a string provides the technical benefit of increasing the robustness against typographic errors, name duplications, and class name mismatches that may occur when a programmer specifies the required service classes in the source code of a service.

FIG. 7C shows that the abstract interface can also comprise a function "registerMySingleton{ }" that is configured to return a registration object "RegisterSingleton". The registration object must be a global variable defined, e.g., in a .cpp file. This ensures that a service can be registered before it is instantiated. The registration object makes itself known to the service manager. The registration object ties the service implementation to the interface but ensures full encapsulation and hiding of the implementation.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combination of features described above can be the following:

Feature combination FC1: a feature combination comprising the features of claim 1.

Feature combination FC2: a feature combination comprising the features of claims 1 and 2.

Feature combination FC3: a feature combination comprising the features of claim 3 and of any one of the feature combinations FC1-FC2.

Feature combination FC4: a feature combination comprising the features of claim 4 and of any one of the feature combinations FC1-FC3.

Feature combination FC5: a feature combination comprising the features of claim 5 and of any one of the feature combinations FC1-FC4.

Feature combination FC6: a feature combination comprising the features of claim 6 and of any one of the feature combinations FC1-FC5.

Feature combination FC7: a feature combination comprising the features of claim 7 and of any one of the feature combinations FC1-FC6.

Feature combination FC8: a feature combination comprising the features of claim 8 and of any one of the feature combinations FC1-FC7.

Feature combination FC9: a feature combination comprising the features of claim 9 and of any one of the feature combinations FC1-FC8.

Feature combination FC10: a feature combination comprising the features of claim 10 and of any one of the feature combinations FC1-FC9.

Feature combination FC11: a feature combination comprising the features of claim 11 and of any one of the feature combinations FC1-FC10.

Feature combination FC12: a feature combination comprising the features of claim 12 and of the feature combination FC11.

Feature combination FC13: a feature combination comprising the features of claim 13 and of any one of the feature combinations FC1-FC12.

Feature combination FC14: a feature combination comprising the features of claim 14 and of the feature combination FC13.

Feature combination FC15: a feature combination comprising the features of claim 15 and of any one of the feature combinations FC1-FC14.

Feature combination FC16: a feature combination comprising the features of claim 16 and of any one of the feature combinations FC1-FC15.

Feature combination FC17: a feature combination comprising the features of claim 17 and of any one of the feature combinations FC1-FC16.

Feature combination FC18: a feature combination comprising the features of claim 18 and of any one of the feature combinations FC1-FC17.

Feature combination FC19: a feature combination comprising the features of claim 19 and of any one of the feature combinations FC1-FC18.

What is claimed is:

1. A computer-implemented method comprising:
providing a service manager operatively coupled to a database management system (DBMS), wherein the DBMS is a software application designed to allow for the definition, creation, querying, updating, and administration of databases;
registering, at the service manager, multiple DBMS services automatically and dynamically at runtime of the DBMS, wherein:
each of the multiple DBMS services, respectively, processes data stored to a database managed by the DBMS;
each of the multiple DBMS services is implemented as a singleton, wherein a singleton is a software object implemented such that it is ensured that only one instance of a particular type of software object can be instantiated at a time; and
a first service of the multiple DBMS services enables the service manager to check whether a cached singleton instance has already been initialized; and
managing, by the service manager, dependencies between the multiple registered DBMS services, wherein:
the dependencies are managed based on source code of the DBMS service specifying dependency services required by the DBMS service;
a class name of each dependency service undergoes an automated conversion into a string to be used as an argument by the service manager for managing the service;
the dependencies are represented in a single data structure and identified and updated at runtime of the DBMS based on performing a depth-first search over a dependency tree representing dependencies of DBMS services registered at the service manager;
the global variable corresponds to a particular DBMS service to be registered at, and managed by, the service manager; and
managing the dependencies further comprises:
responsive to creating the global variable, executing a constructor of a type associated with the global variable; and
detecting cyclic dependencies based on the dependencies of the DBMS services being represented in the form of a directed acyclic graph (DAG).

2. The computer-implemented method of claim 1, wherein the management of the dependencies comprises instantiating the DBMS services in accordance with the dependencies such that all DBMS services required by a particular one of the DBMS services is already instantiated when the particular DBMS service is instantiated by the service manager.

3. The computer-implemented method of claim 1, wherein at least some of the DBMS services represent steps within a workflow of a product manufacturing process and wherein at least some dependencies represent equipment dependencies, workflow dependencies, material dependencies, and supply-dependencies of physical objects involved in the product manufacturing process.

4. The computer-implemented method of claim 1, wherein the management of the dependencies comprises shutting down one or more of the DBMS services in accordance with the dependencies, wherein before any one of the one or more DBMS services is shut down, the shutdown of a first DBMS service is delayed until all DBMS services depending from the first DBMS service are shut down.

5. The computer-implemented method of claim 1, wherein each of the DBMS services is implemented in accordance with a singleton design pattern.

6. The computer-implemented method of claim 1, further comprising adding an additional DBMS service to the DBMS comprising:
registering the additional DBMS service at runtime of the DBMS at the service manager; and
updating the dependencies of the DBMS services such that the dependencies represent the dependencies of the existing and the additional DBMS service.

7. The computer-implemented method of claim 1, wherein the registration of the DBMS services at the service manager is implemented in the form of a decentralized registration process.

8. The computer-implemented method of claim 1, wherein each of the multiple DBMS services implements an interface comprising a method for registering the DBMS service at the service manager.

9. The computer-implemented method of claim 1, wherein each of the multiple DBMS services comprises an instantiateService function and a shutdownService function, the instantiateService function and the shutdownService accessible by the service manager, the method further comprising:
using, by the service manager, the instantiateService function and the shutdownService function of the multiple DBMS services for dynamically orchestrating the instantiation and shutdown of the DBMS multiple services in accordance with the dependencies.

10. The computer-implemented method of claim 1, wherein each of the multiple DBMS services comprises a getRequiredServices function, the getRequiredServices function being accessible by the service manager, the getRequiredServices function being configured to return the names of one or more required DBMS services, each required DBMS service being a DBMS service that needs to be instantiated before the DBMS service comprising the getRequiredServices function is instantiated, the registration of each of the multiple DBMS services comprising:
calling, by the service manager, the getRequiredServices function of the DBMS service to be registered;

automatically checking if the names of the required DBMS services returned by the getRequiredService function identify an already registered DBMS service; and automatically performing, by the service manager, a registration of any DBMS service returned by the getRequiredService function that has not yet been registered DBMS service.

11. The computer-implemented method of claim 10, the getRequiredServices function being configured, upon being called, for:

converting the class names of each of the one or more required DBMS services into a respective string;

converting the one or more strings into a compiler-checkable object; and returning the compiler-checkable object to the service manager having called the getRequiredServices function.

12. The computer-implemented method of claim 1, wherein at last one of the multiple DBMS services specifies one or more other DBMS services required by the at least one DBMS service, the specification of the one or more other DBMS services having the form of a list of class names that are checked by a compiler during compile time, wherein an error is thrown upon compiling a DBMS service class in case the DBMS service class comprises a name of a required DBMS service and the compiler cannot identify a class whose name matches the name of the required DBMS service.

13. The computer-implemented method of claim 12, wherein responsive to the DBMS service class comprising the name of a required DBMS service and the compiler being unable identify a class whose name matches the name of the required DBMS service, the name of the required DBMS service is highlighted in the DBMS service class program code upon design time.

14. The computer-implemented method of claim 1, further comprising:

during registration of one of the DBMS services at the service manager, automatically identifying, by the service manager, one or more other DBMS services required by the one DBMS service to be registered; and updating the dependencies between the multiple registered DBMS services, the DBMS service to be registered and the DBMS services identified during the registration of the one DBMS service such that the dependencies also comprise the dependencies of the DBMS service to be registered and of the required other DBMS services.

15. The computer-implemented method of claim 1, the service manager being a component of an application that is implemented as a selection from the group consisting of: an extension application of the DBMS and an integral component of the DBMS.

16. The computer-implemented method of claim 1, further comprising:

receiving, by the DBMS, a DBMS service request for a particular DBMS service;

identifying, by the service manager, the requested DBMS service within the multiple DBMS services;

identifying, by the service manager, one or more other ones of the registered DBMS services required by the requested DBMS service; and for each of the identified one or more other DBMS services:

responsive to this other DBMS service not yet being instantiated, instantiating this other DBMS service.

17. A computer readable storage medium having program instructions embodied therewith, the program instructions executable by a processor to cause the processor to execute a method comprising:

providing a service manager operatively coupled to a database management system (DBMS), wherein the DBMS is a software application designed to allow for the definition, creation, querying, updating, and administration of databases;

registering, at the service manager, multiple DBMS services automatically and dynamically at runtime of the DBMS, wherein:

each of the multiple DBMS services, respectively, processes data stored to a database managed by the DBMS;

each of the multiple DBMS services is implemented as a singleton, wherein a singleton is a software object implemented such that it is ensured that only one instance of a particular type of software object can be instantiated at a time; and a first service of the multiple DBMS services enables the service manager to check whether a cached singleton instance has already been initialized; and managing, by the service manager, dependencies between the multiple registered DBMS services, wherein:

the dependencies are managed based on source code of the DBMS service specifying dependency services required by the DBMS service;

a class name of each dependency service undergoes an automated conversion into a string to be used as an argument by the service manager for managing the service;

the dependencies are represented in a single data structure and identified and updated at runtime of the DBMS based on performing a depth-first search over a dependency tree representing dependencies of DBMS services registered at the service manager;

the global variable corresponds to a particular DBMS service to be registered at, and managed by, the service manager; and managing the dependencies further comprises:

responsive to creating the global variable, executing a constructor of a type associated with the global variable; and detecting cyclic dependencies based on the dependencies of the DBMS services being represented in the form of a directed acyclic graph (DAG).

18. A computer system comprising:

a database management system (DBMS), wherein the DBMS is a software application designed to allow for the definition, creation, querying, updating, and administration of databases;

a service manager operatively coupled to the DBMS; and the service manager being configured to:

register, at the service manager, multiple DBMS services automatically and dynamically at runtime of the DBMS, wherein:

each of the multiple DBMS services, respectively, process data stored to a database managed by the DBMS;

each of the multiple DBMS services is implemented as a singleton, wherein a singleton is a software object implemented such that it is ensured that only one instance of a particular type of software object can be instantiated at a time; and a first service of the multiple DBMS services enables the service manager to check whether a cached singleton instance has already been initialized; and manage, by the service manager, dependencies between the multiple registered DBMS services, wherein:
the dependencies are managed based on source code of the DBMS service specifying dependency services required by the DBMS service;
a class name of each dependency service undergoes an automated conversion into a string to be used as an argument by the service manager for managing the service;
the dependencies are represented in a single data structure and identified and updated at runtime of the DBMS based on performing a depth-first search over a dependency tree representing dependencies of DBMS services registered at the service manager;
the global variable corresponds to a particular DBMS service to be registered at, and managed by, the service manager; and
managing the dependencies further comprises:
responsive to creating the global variable, executing a constructor of a type associated with the global variable; and
detecting cyclic dependencies based on the dependencies of the DBMS services being represented in the form of a directed acyclic graph (DAG).

* * * * *